UNITED STATES PATENT OFFICE.

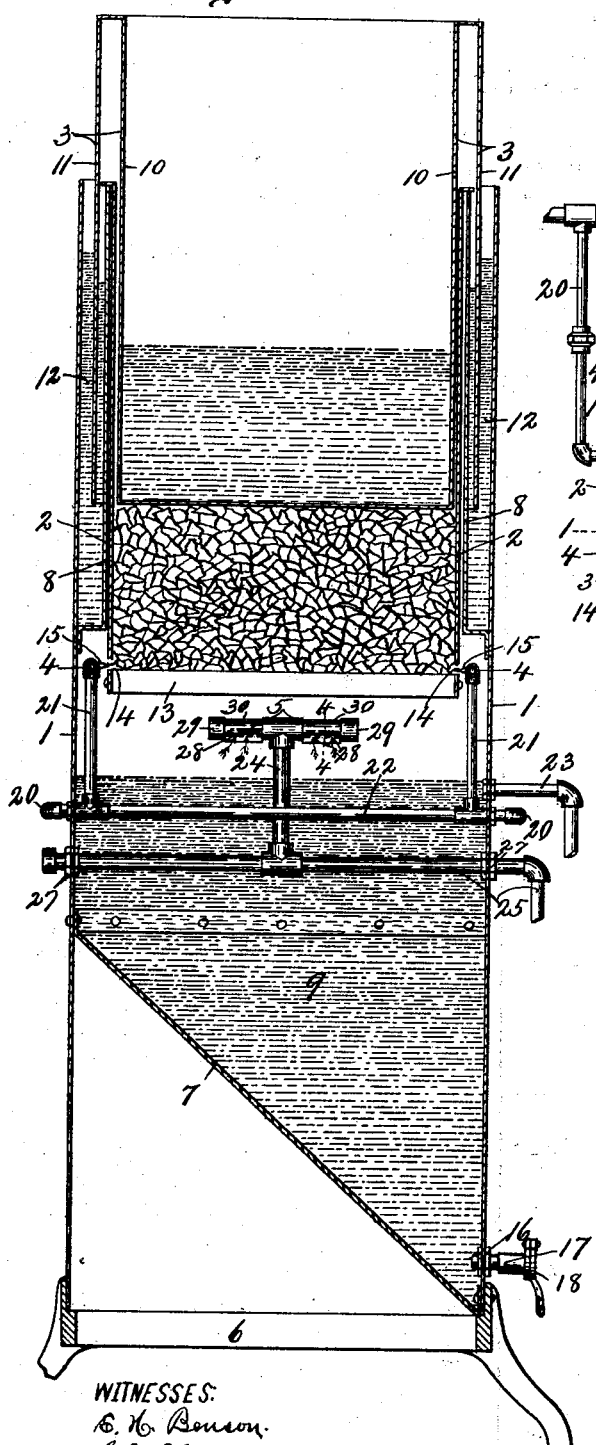

MARTIN J. ERK, OF BINGHAMTON, NEW YORK.

ACETYLENE-GAS GENERATOR.

SPECIFICATION forming part of Letters Patent No. 696,229, dated March 25, 1902.

Application filed June 19, 1901. Serial No. 65,142. (No model.)

*To all whom it may concern:*

Be it known that I, MARTIN J. ERK, of Binghamton, in the county of Broome, in the State of New York, have invented new and useful Improvements in Acetylene-Gas Generators, of which the following, taken in connection with the accompanying drawings, is a full, clear, and exact description.

My invention relates to improvements in acetylene-gas generators.

The object of this invention is to provide a simple and practical device adapted to receive a large body of carbid, which may be readily converted into gas by small jets of water directed against the lower surface of the carbid.

A further object is to so construct and arrange the parts of my invention as to prevent any clogging or choking of the carbid within its receptacle during the process of forming gas therefrom, or, in other words, for permitting a free discharge of the sludge through the supporting-grate of the carbid-receptacle and at the same time permitting the body of the live and active carbid to readily gravitate onto the supporting-grate in the path of the jets of water.

Another object of this invention is to so arrange the water-discharging nipples as to contact the water with the lower surface of the carbid in alinement with the spaces between the grate-bars, so that the resultant formation of the sludge is readily precipitated into the water-containing tank at the base of the generator; and a still further object is to provide a suitable gas-discharge conduit with a perforated head interposed between the water-line and the bottom of the carbid-receptacle for receiving the gas and conducting the same to the gas-discharge conduit.

It is well known that considerable difficulty is experienced in properly disposing of the sludge accumulating during the formation of gas, and I have therefore constructed my improved generator not only for the prime object of generating gas economically and efficiently, but also with the object of rendering the removal or disposition of the sludge as nearly automatic as possible.

To this end the invention consists in the construction, combination, and arrangement of the parts of an acetylene-gas generator, as hereinafter fully described, and pointed out in the claims.

Referring to the drawings, Figure 1 is a transverse vertical sectional view of my improved gas-generator. Fig. 2 is a plan of the detached water-feed conduits, showing the shell or casing of the generator in dotted lines. Figs. 3 and 4 are sectional views taken on lines 3 3, Fig. 2, and 4 4, Fig. 1.

I have found after careful study and many experiments with this class of devices that one of the most difficult problems to overcome has been to provide means for generating gas from a large body of carbid without causing more or less after production of gas, or, in other words, maintaining a substantially dry body of carbid after the water has been shut off from contact therewith. I have also found that when the carbid is stored in large quantities for the formation of gas directly therefrom, even though a clean and active surface of the carbid may be maintained for variable periods of time, this body becomes choked or clogged within the reservoir and fails at times to feed into the path of the jets of water, thereby rendering the generator very unreliable.

My invention is designed to overcome these difficulties and to carry out the objects as previously set forth, and consists of a shell 1, a carbid-receptacle 2, a follower 3, water-distributing heads 4, and a gas-receiving head 5. The shell 1 may be of any desired form, size, or construction, but is preferably rectangular in form, being supported upon a suitable base 6 and provided with an inclined bottom 7 and inner shell 8. The base of the shell 1 above the bottom wall 7 is adapted to receive the body of water 9, the level of which is disposed in a plane beneath the bottom of the carbid-receptacle 2 a sufficient distance to form a suitable gas-chamber between the water-line and the body of carbid.

The upper end of the receptacle 1 is preferably open for receiving the follower 3, which is removable through said opening and consists of an inner shell 10 and an outer shell 11, the inner shell being provided with a bottom wall and is adapted to receive a quantity of water or other weight for the purpose of holding the bottom wall against the upper surface of the body of carbid, thereby facilitating the gravitation of the carbid upon its supporting-grate during the process of forming gas therefrom, this follower serving to follow up the downwardly-gravitating body of carbid incidental to the dissolution and precipitation of the portion adjacent to the grate and reduces the gas-space as the carbid is exhausted. This shell 10 is open at its upper end, and the outer shell 11 is united to the upper end of the inner shell 10, the lower end of said outer shell 11 being open and inserted into the space between the shells 1 and 8.

The shell 8 incloses the carbid-receptacle and, together with the outer walls 1, forms a suitable water-chamber 12, the level of which is maintained above the bottom edge of the outer shell 11 for forming a water seal, and thereby preventing the escape of gas from the carbid-receptacle except through the channels designed for this purpose.

The carbid-receptacle 2 may also be of any desired form or size adapted to enter the upper end of the shell 1 between the walls 8 and is preferably rectangular in cross-section, being provided with a grate 13 at its base and with apertures 14, arranged slightly above or substantially coincident with the upper surface of the grate-bars. These grate-bars are preferably substantially parallel with each other and are separated a sufficient distance to permit the gravitation of the sludge therethrough, and the apertures 14 are arranged in substantial alinement with the spaces between the grate-bars, being adapted to receive the water discharged from the water-heads 4. Any desired means may be employed for discharging water through these apertures in substantial alinement with the spaces between the grate-bars and against the lower surface of the carbid; but I preferably arrange the heads 4 at the opposite ends of the grate-bars and provide the same with suitable nipples 15, having restricted openings arranged to discharge fine jets of water through the apertures 14 and against the face of the carbid adjacent to the upper face of the grate 13, these nipples being also arranged to discharge the jets of water toward each other in a line substantially coincident with the spaces between the grate-bars, the descending water serving to wash the rising gas. It is thus evident from the foregoing description that the water discharged through these nipples 15 and apertures 14 comes in contact with the portions of the body of carbid immediately above the spaces between the grate-bars, and therefore the sludge which is formed is forced or drops by gravity between said grate-bars and is precipitated through the body of water 9 onto the inclined bottom wall 7, along which the precipitated sludge gravitates to a point in proximity to a discharge-opening 16, formed in one of the side walls of the base of the receptacle 1.

The inclined wall 7 is preferably trough-shaped, or, in other words, is so constructed as to concentrate all of the precipitated sludge toward the discharge-opening 16. In order to remove or clean out the sludge from the bottom of the receptacle 1, I usually provide a suitable conduit 17, arranged within the opening 16 and having a gate or valve 18, which may be readily opened to the full head of the pipe 17, and, in fact, this pipe 17 and gate 18 may be so arranged that the attendant may readily insert any suitable instrument therein in order to more properly and entirely remove the sludge and water from the base of the receptacle 1.

The means for supplying water to the heads 4 preferably consists of a main feed-pipe 19 and branch feed-pipes 20, connected to upright conduits 21, which in turn are connected, respectively, to the opposite heads 4, the main feed-pipe 19 being so arranged as to supply water to any number of generators which it may be desired to use for increasing or reducing the capacity of the steam-generating plant. The branch conduits 20 are usually arranged at opposite sides of the generator and are passed through apertures in the outer shell 1 at a point beneath the level of the body of water 9 in order to prevent any leakage of gas through the openings through which the pipes 20 pass. I preferably unite the ends of the pipes 20 by a conduit 22, arranged within the water-chamber in the base of the receptacle 1 and is suitably secured to the outer walls of said receptacle for forming a brace between said walls, and the upright pipes 21 are connected at their lower ends to this transverse pipe 22.

It is apparent from the foregoing description that the water passes from the main conductor 19 through the branch conductors 20 and into the transverse conduit 22, from which it is distributed through the upright conduits 21 into the heads 4, and thence outwardly into contact with the carbid through the jets 15. In order to maintain the water at a predetermined level within the base of the receptacle 1, I provide an overflow 23, which may be connected to any desired form of trap or water seal for preventing the escape of gas therethrough.

The means for receiving and conveying the gas from the generator consists of the head 5, which is mounted upon the upper end of an upright pipe 24, said upright pipe having its lower end connected to a discharge-conduit 25, extending outwardly through the shell 1, this discharge-pipe 25 being arranged to be connected to any form of gasometer which it may be desirable to use. The conduit 25 preferably extends through the opposite walls of the shell 1 beneath the water-line and is secured to said opposite walls by suitable lock-nuts 27 for forming additional support for the side walls of the shell 1.

As previously stated, the head 5 is arranged between the supporting-grate 13 and the upper surface of the body of water 9 and is provided with a series of perforations 28 and caps 29, said perforations being arranged to receive the generated gas, and the head 5 serves to conduct the gases to the upright pipe 24, which gases are then conducted through the pipe 25 and to the gasometer. The perforations 28 are formed in the lower face of the wall of the head 5, and in order to prevent the passage of any of the sludge or sediment into the gas-conduits I usually inclose the upper and side portions of the head with a suitable hood or hoods 30, which rest upon the upper face of the head and depend a sufficient distance below the lower face therewith to prevent the formation or accumulation of any of the sludge or sediment within the apertures 28.

The operation of my invention will now be readily understood upon reference to the foregoing description and the accompanying drawings, and it will be noted that although I have described a generator of substantially rectangular cross-section any other form may be employed without departing from the spirit of this invention.

Having thus described my invention, what I claim, and desire to secure by Letters Patent, is—

1. In an acetylene-gas generator, the combination of an inclosing shell and a carbid-receptacle therein and provided with a grate-bottom, said shell having water and gas chambers beneath the grate and a water-jacket surrounding the carbid-receptacle, a follower having portions thereof movable in the receptacle and jacket, and means independent of the receptacle and grate and alined with the apertures for discharging water laterally over the upper surface of the grate and against the carbid thereon.

2. In an acetylene-gas generator, the combination with an inclosing shell having water and gas chambers in its base and a water-jacket at its upper end, a carbid-receptacle removably suspended from the upper end of the shell and having a grate-bottom and apertures alined with the upper face of the grate, said grate being removable with the receptacle, a follower removable in the receptacle and jacket, and means independent of the receptacle and grate and alined with the apertures for discharging water through the apertures and against the carbid.

3. In an acetylene-gas generator, the combination with an inclosing shell having water and gas chambers in its base and a water-jacket at its upper end, a carbid-receptacle suspended from the upper end of the shell and having a grate-bottom and apertures alined with the upper face of the grate, a follower movable in the receptacle and jacket, and means for discharging water through the apertures and against the carbid, a gas-conduit extending through the shell beneath the water-line and having a receiving-head in the gas-chamber above the water-line and beneath the grate, said head being formed with apertures in its lower wall for receiving the gas and with wings depending from its opposite sides beneath the lower wall for preventing the entrance of any sediment into the receiving-head.

4. An acetylene-gas generator comprising a water-containing shell, a removable carbid-receptacle above the water-line and provided with separated grate-bars secured to the receptacle and removable therewith, and a water-conduit separate from the receptacle or grate and having lateral discharge-nipples alined with the upper face of the grate for discharging water against the lower face of the carbid, the receptacle having apertures to receive the jets of water from the nipples for the purpose described.

5. In an acetylene-gas generator the combination with a shell having a gas-chamber, a carbid-receptacle above the gas-chamber and provided with separated grate-bars, said receptacles having apertures at the ends of the grate-bars and alined with the spaces between said bars, and a water-conduit having discharge-openings alined with the apertures and discharging jets of water into and lengthwise of said spaces between the grate-bars for the purpose described.

6. The combination with a removable carbid-receptacle having a horizontal grate-bottom removable with the receptacle, said receptacle having apertures in its side walls, a shell inclosing the bottom of the carbid-receptacle, and a water-supply conduit having nipples alined with the apertures and arranged to discharge jets of water through the apertures and against the lower face of the carbid and substantially parallel with the upper face of the grate.

7. A carbid-receptacle having a grate-bottom and apertures in its side walls alined with the upper face of the grate, in combination with an inclosing shell having a water-jacket above the apertures and a water-conduit beneath the water-jacket having openings discharging through said apertures against the carbid.

8. The combination with a carbid-receptacle having separated bottom grate-bars and apertures alined with the spaces between the grate-bars, of an inclosing shell having a water-jacket, and a water-conduit beneath the jacket having discharge-openings alined with said apertures for the purpose described.

9. An acetylene-gas generator comprising an inclosing shell having water and gas chambers and an open upper end, a carbid-receptacle supported within the shell and removable through said opening, said receptacle having a grate-bottom and apertures in its side walls above the grate, the grate being movable with the receptacle and means for discharging water through the apertures in said side walls and against the lower surface of the carbid.

10. An acetylene-gas generator comprising an inclosing shell open at its upper end and having a water-chamber and a discharge-opening in its base and an inclined bottom wall troughed to concentrate the water and sludge at said discharge-opening, the upper end of the shell having a water-jacket independent of the former water-chamber, a carbid-receptacle supported within the shell and removable through its upper end, said receptacle having a grate-bottom and apertures through its side walls, and means for discharging water between the water-chamber and jacket through the apertures against the lower face of the carbid.

11. An acetylene-gas generator comprising a water-containing shell open at its upper end and having an inclined bottom wall and a discharge-opening above and in proximity to the lower edge of said wall, the shell having a water-jacket at its upper end, a carbid-receptacle suspended from its upper end into the shell above the water-line and having a grate-bottom secured thereto and normally in a plane beneath the water-jacket, said receptacle being removable through the upper end of the shell and having apertures alined with the upper face of the grate, and means for discharging water through said apertures against the carbid.

12. In an acetylene-gas generator, the combination of an inclosing shell and a carbid-receptacle removably suspended therein, said receptacle having a grate-bottom and apertures alined with the upper surface of the grate, the grate being removable with the receptacle and means between the shell and receptacle for discharging water laterally through the apertures and against the carbid.

In witness whereof I have hereunto set my hand this 30th day of May, 1901.

MARTIN J. ERK.

Witnesses:
H. E. CHASE,
MILDRED M. NOTT.